United States Patent [19]

Charlton

[11] 4,102,357
[45] Jul. 25, 1978

[54] VARIABLE FLOW OUTLET VALVES
[75] Inventor: Mark Charlton, Market Weighton, England
[73] Assignee: Hawker Siddeley Aviation Limited, England
[21] Appl. No.: 734,993
[22] Filed: Oct. 22, 1976
[30] Foreign Application Priority Data
Oct. 24, 1975 [GB] United Kingdom ............... 43859/75
[51] Int. Cl.² .............................................. F16K 5/10
[52] U.S. Cl. ............................... 137/625.32; 251/209; 251/368; 181/258
[58] Field of Search .............................. 251/209, 368; 137/625.32; 181/226, 258; 138/46, 45 A
[56] References Cited
U.S. PATENT DOCUMENTS 2,687,746  8/1954  Argentieri ..................... 181/258 X
3,292,897  12/1966  McClelland ..................... 251/368 X
3,574,310  4/1971  Souriau ............................ 251/368 X
3,693,659  9/1972  Parola .............................. 251/368 X FOREIGN PATENT DOCUMENTS
722,570  1/1955  United Kingdom ............ 137/625.32

Primary Examiner—Arnold Rosenthal
Attorney, Agent, or Firm—Rose & Edell

[57] ABSTRACT

A variable flow air outlet valve is provided, e.g. for admitting conditioned air to an aircraft cockpit, comprising two relatively rotatable parts relative rotation of which progressively varies the length of the path that the air must follow through the valve before reaching the outlet so that the outlet flow is changed due to change in the amount of viscous drag the air is subjected to inside the valve. In this way change in the outlet flow is achieved without noise-producing turbulence. The path for the air within the valve extends through varying lengths of a body of foraminous material such as a reticulated foam material.

4 Claims, 3 Drawing Figures

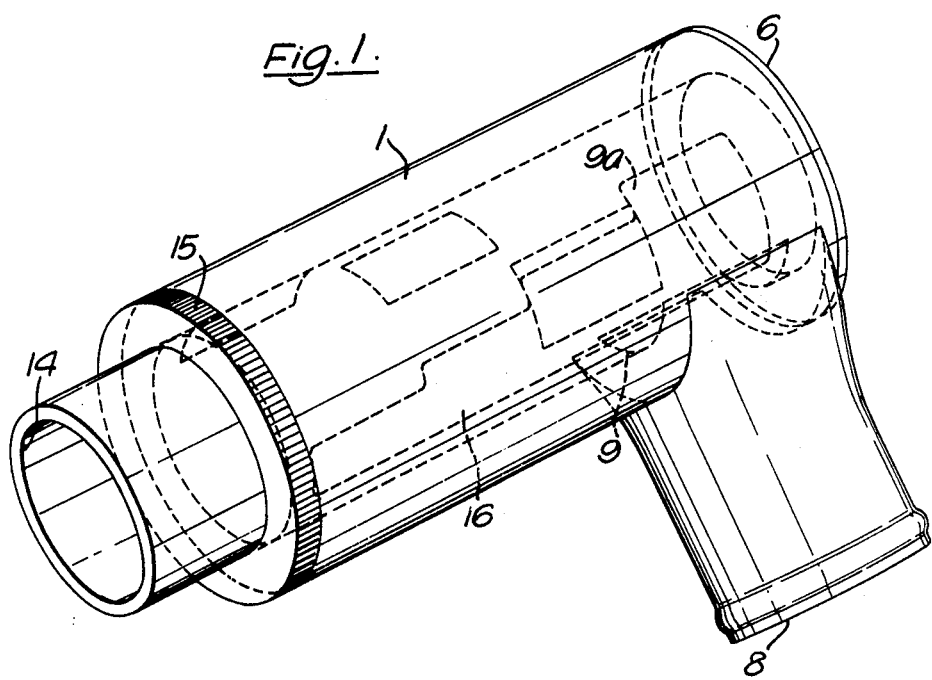

U.S. Patent  July 25, 1978  Sheet 2 of 2  4,102,357
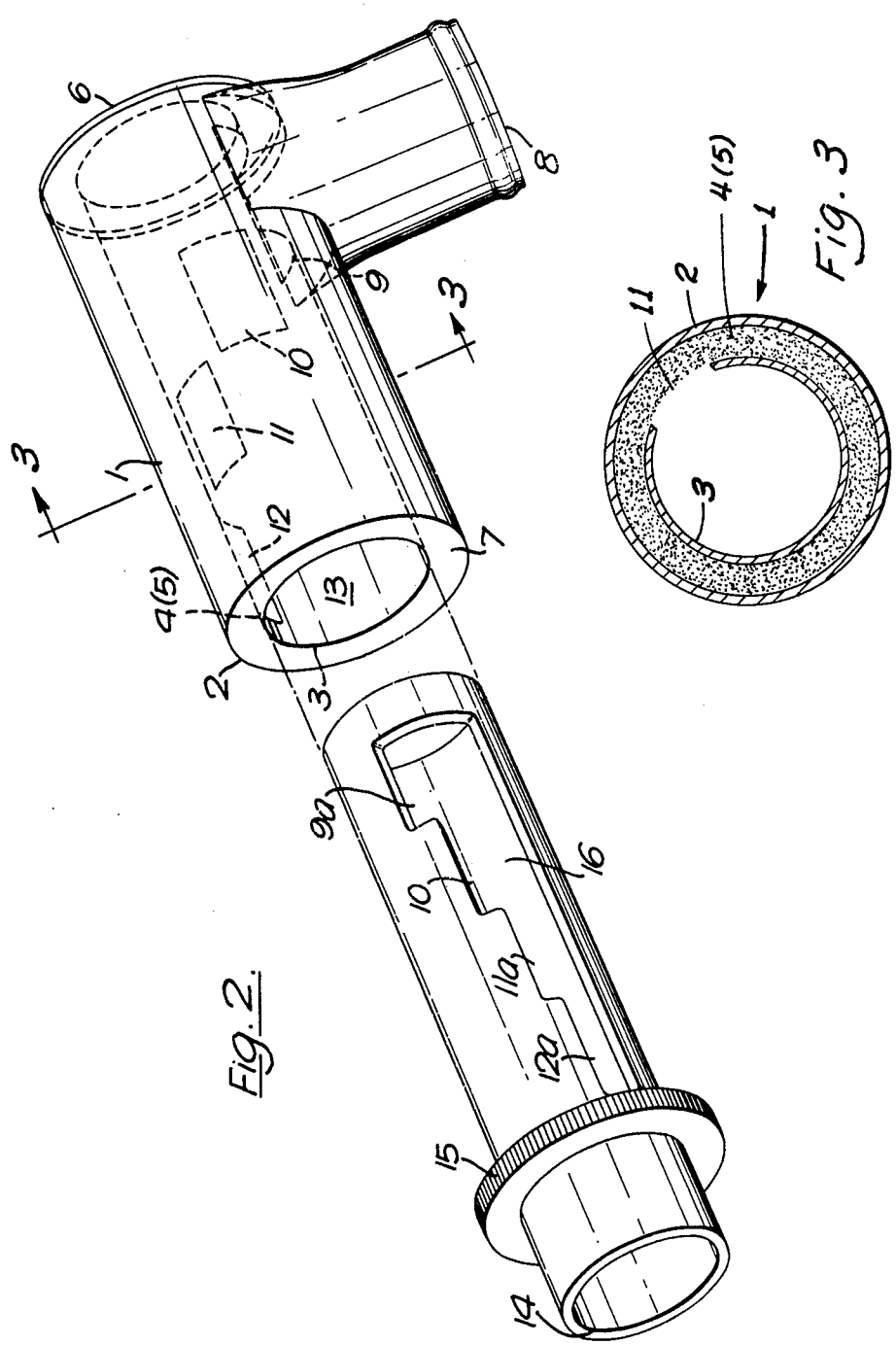

VARIABLE FLOW OUTLET VALVES

This invention relates to air distribution outlet valves. More particularly, it concerns a valve for providing variable amounts of air with minimum noise emission in an air conditioning system.

In known forms of air distribution valve, fluid flow may be varied by selectively changing the area of the supply duct by the introduction of some form of variable constrictor as employed in plug valves, butterfly valves, poppet and gate valves. But such constriction, whilst providing the desired mass flow by fluid pressure variation, achieves this by turbulence effect which is noise productive and, in an aircraft cockpit environment for example, distracting and undesirable. It is an object of the present invention to provide a solution to this shortcoming.

According to the present invention, there is provided a variable outlet air distribution valve, comprising relatively rotating parts and wherein the flow at the air outlet of the valve is adjusted by varying the amount of viscous drag to which the air flow is subjected as it passes through the valve from inlet to outlet, said viscous drag variation being produced by relative rotation of said valve parts which varies the length of the flow path through the valve followed by the air, whereby flow reduction at the outlet is obtained substantially without inducing noise-producing turbulence.

If the fluid flow through a supply duct can be constrained to follow a continuously increasing flow path length there will be an associated progressive reduction in pressure at the end of the flow path due to viscous pressure loss as a function of viscous drag and less turbulent pressure loss. By reducing turbulence the amount of noise generated is also reduced.

One arrangement in accordance with the invention will now be described by way of example and with reference to the accompanying drawings, in which:

FIG. 1 is a diagrammatic pictorial view of a valve assembly,

FIG. 2 is a further diagrammatic pictorial view of the valve but with the inner sleeve separated from the valve body to demonstrate the construction, and FIG. 3 is a view in section on the line 3—3 of FIG. 2.

Referring to the drawings, a valve outer body assembly 1 comprises concentric cylindrical bodies 2 and 3, the intervening space 4 being filled with a compressed porous material 5.

An end plate 6 seals off one end of the valve body 1 whilst at the outlet end a suitable seal 7 closes off the intervening space 4. An air inlet duct 8 is in communication with the intervening space 4 and, by means of a rectangular vent 9 in the inner cylindrical body 3, also provides direct air passage into the interior duct 13. The vent 9 is one of a number of constant velocity vents, the remainder in this embodiment being 10, 11, and 12. Each one is staggered radially and longitudinally relatively to its adjacent vent and all are in communcation with the intervening space 4.

A tubular outlet sleeve 14 is of outside diameter substantially corresponding to the inside diameter of the cylindrical body 3 such that the outlet sleeve 14 has a snug fit into the main body 1 as shown in FIG. 1 which will allow rotation but without significant pressure loss between the two surfaces. The outlet sleeve 14 further incorporates a knurled pressure selecting flange 15 which furthermore provides a longitudinal stop when the valve is assembled. This ensures that a stepped slot 16 in the sleeve 14 maintains correct longitudinal relationship with the vents 9-1, the length of each step $9a - 12a$ corresponding to the length of each vent.

With the valve assembled as shown in FIG. 1, variable air supply is available by rotation of the outlet sleeve 14. If high pressure flow is required the sleeve is rotated until that part $9a$ of the slot 16 is in register with the vent 9. This ensures a direct flow path from the air inlet duct 8 into the valve duct 13 and thence through the valve outlet 14. In this position the remaining vents 10, 11, and 12 are blanked off by the outlet sleeve 14. If a lower pressure supply is required this may be obtained by further rotation, each vent being associated with a particular mass flow. In this embodiment there are four pressure variables available. For example, to obtain the lowest possible pressure flow the sleeve must be rotated until that portion $12a$ of the slot 16 is in register with the vent 12. In this position vents 9, 10 and 11 are blanked off and inlet air under high pressure is constrained to filter through the porous material 5 before passing through the vent 12 into the outlet sleeve 14. The viscous drag effect of the porous material will reduce the pressure flow but as there will be little turbulence, noise emission of the reduced pressure flow will be minimal.

As to the porous material, the range of materials that can be employed is quite wide and the ultimate material in any particular case will be chosen to suit the environmental conditions to which the valve will be subjected. Basically, there will perhaps be two categories:

a. Metal foam or wire wool, or alternatively metallised plastic, for higher temperature operations;

b. Cheaper forms for use in cooling applications, made of polystyrene or polyurethane or similar kinds of material.

The construction of the foam has to be of the open cell kind such as is used for panscrubbers; one particular type has been named reticulated foam. In this instance the walls of the cells are removed leaving only flexible strands of material forming the cell block, so that the cells are of open construction. Such foam has recently been produced for use in fuel tanks to suppress explosions and although it can be made in many materials it is generally now known under the name reticulated foam. A successful valve according to the invention has been built using such reticulated foam compressed into the chamber 4 of the valve.

What I claim is:

1. A viasuable outlet are distorbution valve, comprising an outer valve body and a coaxial inner valve sleeve rotatable therein, the outer valve body having inner and outer generally cylindrical wall members with a space between filled with porous material and an air inlet communicating with said space at one end, and the inner sleeve fitting within the inner cylindrical member of the outer body and having an air outlet from the sleeve interior at one end of said sleeve, cooperating ports being provided in the sleeve wall and in the inner cylindrical member of the outer body such that relative rotation of the inner sleeve and outer body changes the axial position along the body and sleeve at which the porous-material filled space in the outer body communicates with the interior of the sleeve.

2. A valve according to claim 1, wherein the inner cylindrical member of the outer valve body has a series of ports along its length that are staggered both axially and circumferentially, and the inner sleeve has a single axially-extending port that has a series of steps along its length at axial locations corresponding to the axial locations of the series of ports of the valve body.

3. A valve according to claim 1, wherein the inner sleeve projects from within the outer valve body at the end thereof remote from the air inlet, said projecting end of the inner sleeve providing the air outlet and having a knurled flange for rotating the sleeve.

4. A valve according to claim 1, wherein the porous material is reticulated metal foam.

* * * * *